(12) United States Patent
Young

(10) Patent No.: US 8,726,970 B2
(45) Date of Patent: May 20, 2014

(54) EXTENSIBLE WINDOW SHADING DEVICE

(71) Applicant: Hai Tee Young, Rowland Heights, CA (US)

(72) Inventor: Hai Tee Young, Rowland Heights, CA (US)

( * ) Notice: Subject to any disclaimer, the term of this patent is extended or adjusted under 35 U.S.C. 154(b) by 0 days.

(21) Appl. No.: 13/507,813

(22) Filed: Oct. 4, 2012

(65) Prior Publication Data

US 2014/0096919 A1    Apr. 10, 2014

(51) Int. Cl.
*B60J 3/02* (2006.01)

(52) U.S. Cl.
USPC .................. 160/187; 160/370.21; 160/166.1; 160/220; 74/403

(58) Field of Classification Search
USPC ............ 160/370.23, 186, 187, 201, 205, 206, 160/207, 200, 220, 370.21, 166.1, 176.1 R, 160/84.08; 296/97.8; 16/297, 337; 49/74.1, 49/403, 92.1
See application file for complete search history.

(56) References Cited

U.S. PATENT DOCUMENTS

| | | | | | |
|---|---|---|---|---|---|
| 702,148 | A | * | 6/1902 | Nettleton | 49/403 |
| 3,184,265 | A | * | 5/1965 | Calabrese | 296/97.8 |
| 3,369,838 | A | * | 2/1968 | Nelson | 296/97.8 |
| 3,520,346 | A | * | 7/1970 | Green | 160/165 |
| 5,165,748 | A | * | 11/1992 | O'Connor | 296/97.6 |
| 5,339,591 | A | * | 8/1994 | Underdahl | 52/473 |
| 5,634,682 | A | * | 6/1997 | Young | 296/97.8 |
| 5,884,731 | A | * | 3/1999 | Young | 296/97.4 |
| 5,887,386 | A | * | 3/1999 | Alexanian et al. | 49/403 |
| 6,123,138 | A | * | 9/2000 | Young | 160/168.1 R |
| 8,474,187 | B2 | * | 7/2013 | Marocco | 49/403 |
| 2013/0075046 | A1 | * | 3/2013 | Trousdale | 160/84.08 |

* cited by examiner

*Primary Examiner* — Blair M. Johnson

(57) ABSTRACT

An extensible car window shading apparatus mountable inside the car and comprising a first plurality of slats having at each longitudinal end a slat hole in which a slat spring attached to a slat stick is inserted, such that the slat stick extends outwardly from the slat hole, a second plurality of panels, the second plurality being exactly twice the first plurality, such that there is a panel at each longitudinal end of each slat, wherein each panel has a panel hole in which a panel spring is inserted, the panel hole being configured to receive the slat stick, and wherein the panels on each side of the apparatus are joined by hinges, such as to allow folding or deploying of the extensible car window shading apparatus by a user, and a support arm that keeps the extensible car window shading apparatus in folded position.

4 Claims, 14 Drawing Sheets

EA

EB

EC

EXTENSIBLE WINDOW SHADING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Description of the Related Art

The original invention described in U.S. Pat. No. 6,123,138 possesses three faults that create difficulty when attempting to use the invention. The invention described herein is intended to address those faults.

The original invention may require users to puncture the ceiling of their car in order to properly mount it. Because our invention must be fixed to the car ceiling, and because the ceiling of many cars is so thin, the invention has become undesirable to use by consumers. This fault must be addressed.

Many cars have handles located near where the ceiling meets the door. The original invention did not consider the possibility of interference between this handle and the device.

The original invention was designed to have at least three slats that cover the entire window or windshield. Not only is this illegal, but it is dangerous, as the obstruction to the drivers view may result in collisions. Realistically, late afternoon sunlight is not powerful enough to cause physical damage, and so it is not necessary to create a barrier that blocks the sun at such low angles. Only two or three slats, covering a length of 6 to 10 inches, is enough to block the sun at the angles where radiation may be a concern.

The aim with this application is to correct the above shortcomings.

BRIEF SUMMARY OF THE INVENTION

U.S. Pat. No. 6,123,138 raises concerns regarding how the device can be mounted on the ceiling without puncturing the roof of the car. This result is undesirable, as it may leave the interior open to rain water, a result that may negatively impact the likelihood of consumers using the device. In one exemplary embodiment, the new device is designed to adhere to the lowest part of the ceiling (for example, the place of the ceiling just before it meets the car door), a part that is thick enough to hold (without puncture) the length of a nail or screw, allowing it to keep the device firmly mounted. Thus an advantage is reduced (or completely mitigated) damage to the user's car. Another possible solution is the use of three second glue to adhere the top section of the device to the ceiling.

In another exemplary embodiment, the invention will use rectangular sections in the device, as shown in FIG. 1. All sections of the device, except for the lowest section, are similar in structure, containing two hinges fastened to opposite faces (as shown in FIG. 2B) and a hole in the middle of the section to mount a spring. As there is no need for a lower hinge on the bottom section, it has been modified compared to the other sections. Each section is connected by hinges located on alternating faces so that the device may be compactly folded when not in use.

In another exemplary embodiment, the device uses spring-loaded slat sticks to attach the central slats to the outside sections. Thus an advantage is an easily assembled device that can just as easily be dismantled for service or repair.

BRIEF DESCRIPTION OF THE DRAWINGS

FIG. 2D illustrates the configuration of the sections in their stowed state.

DETAILED DESCRIPTION OF THE PREFERRED EMBODIMENTS

Figure 1:
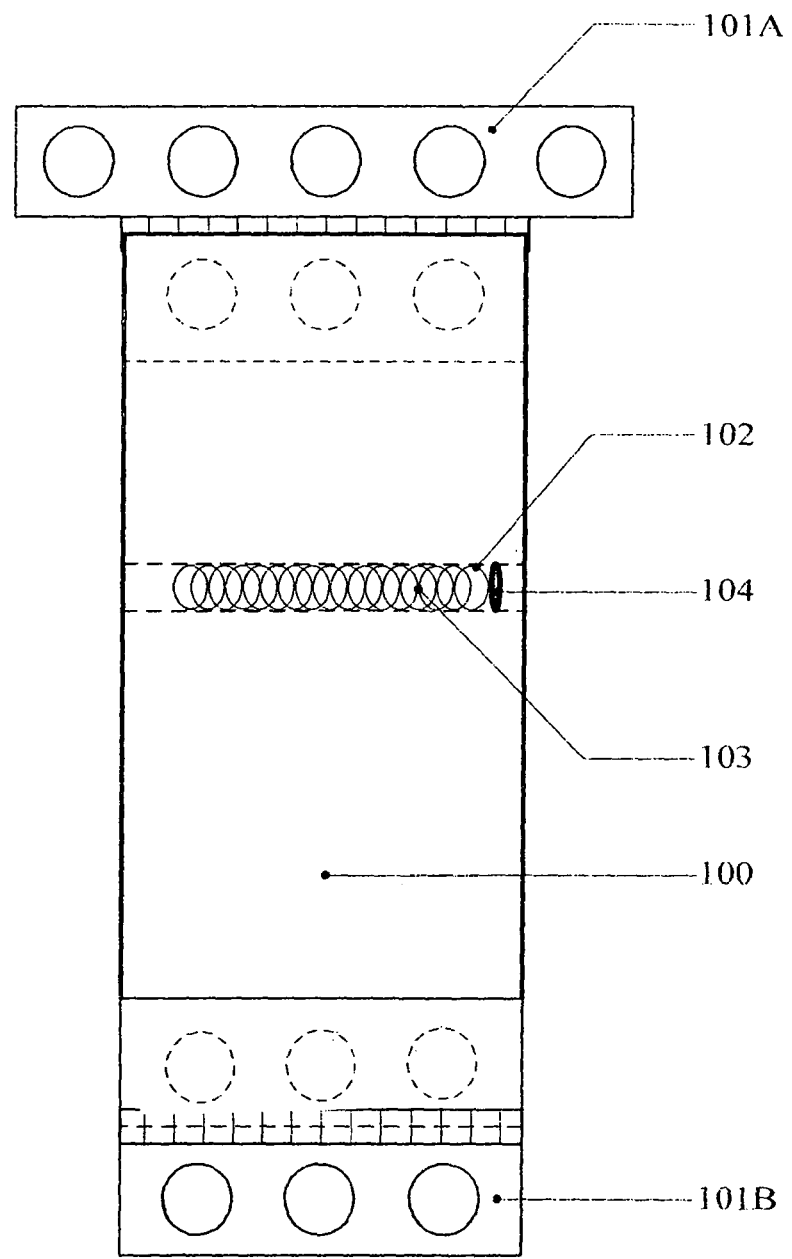
FIG. 1 illustrates a section of the device.

FIG. 1 shows a (non-lowest) section/panel of the device. In the middle of the section, there is a hole 102 equipped with spring 103 and a hard plate 104 of the same size and same shape as the slat stick 101AA (FIG. 9) which may prevent damage to the hole-stick interface. There is an upper hinge 101A, the top part of it attached to the lowest section of the ceiling and the lower part attached to a face of the first section of the device. The top half of the lower hinge 101B is connected to the bottom of the first section, on the face opposite of that which the upper hinge is connected to. This is to allow the device to fold neatly upon itself when not in use. The bottom half of the lower hinge 101B connects the first section of the device to the top of the second section. Note the design on upper part of top hinge 101A is wider than ordinary hinge in order to generate greater holding power at the mounting surface.

Figure 2A:
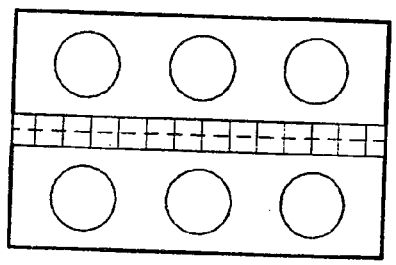
FIG. 2A illustrates a hinge used in the design.

FIG. 2A illustrates an ordinary hinge 101B. It connects the bottom part of the first section with the top part of the second section, and is located on the face opposite that of hinge 101A.

Figure 2B:
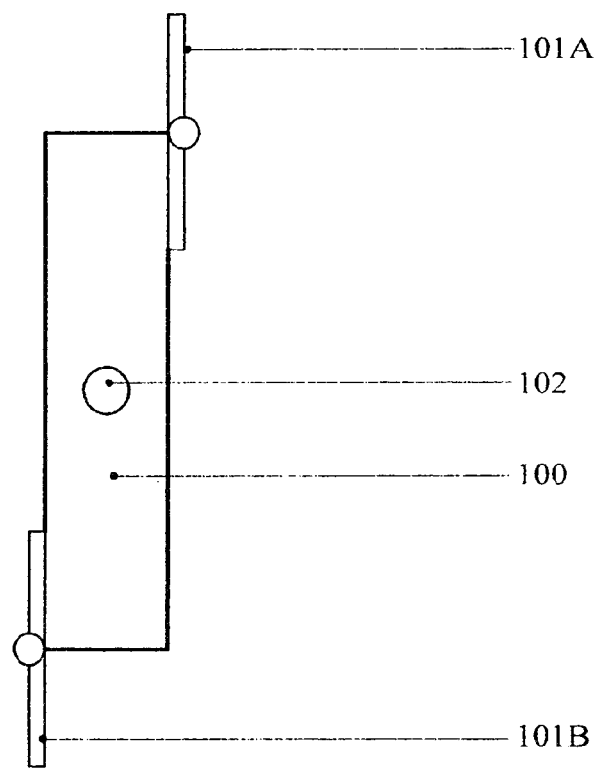
FIG. 2B illustrates the configuration of hinges on a single section of the device.

FIG. 2B illustrates the hinge configuration on the second section of the design. The second section is the middle section of a three section set.

Figure 2C:
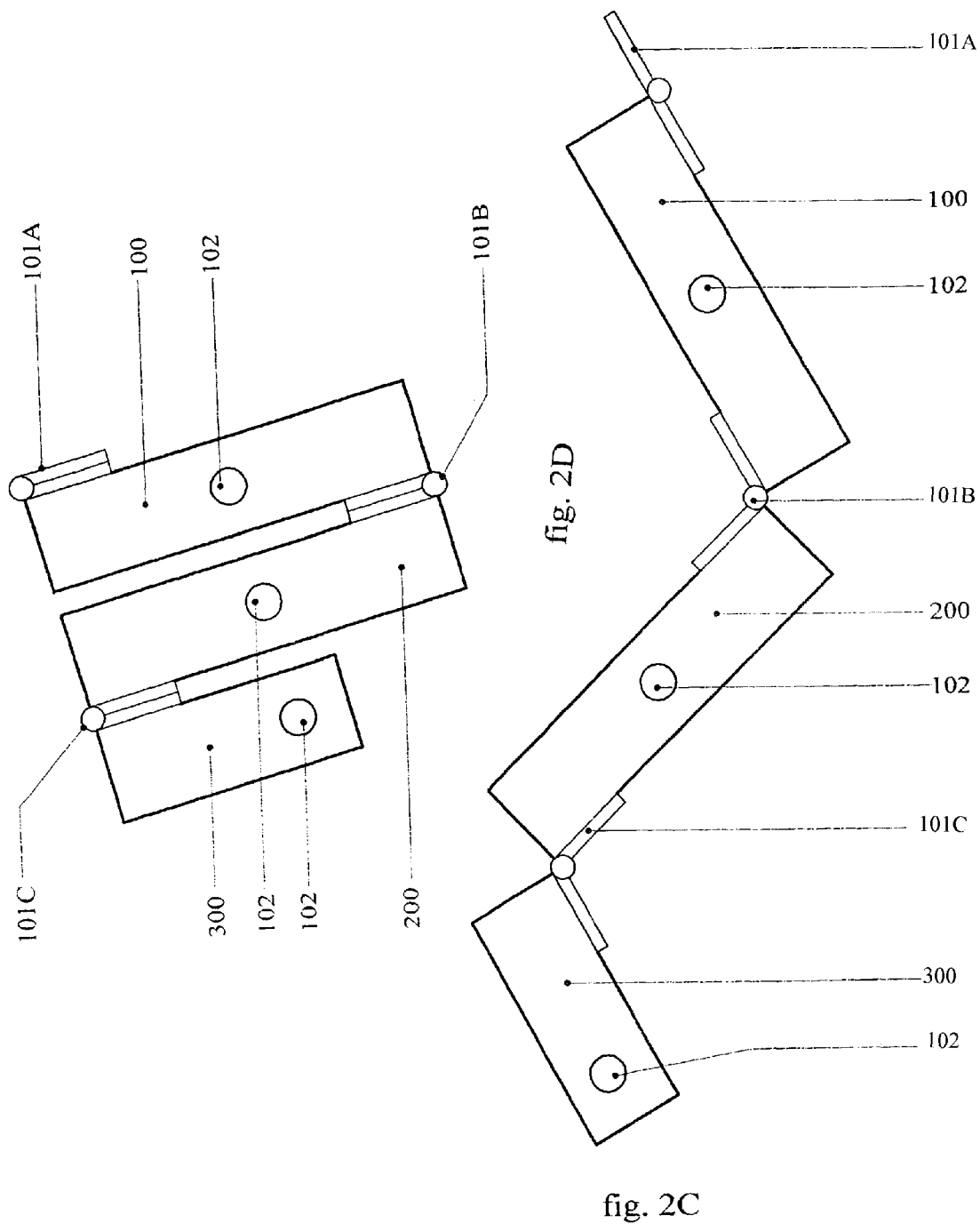
FIG. 2C illustrates the configuration of the sections in their deployed state.

FIG. 2C illustrates the device fully extended. Note that the fully deployed position of the device may not fully extend the hinges. This is to allow users to easily push the device into a closed position without damaging the device.

FIG. 2D illustrates the device in a contracted position.

Figure 2E:
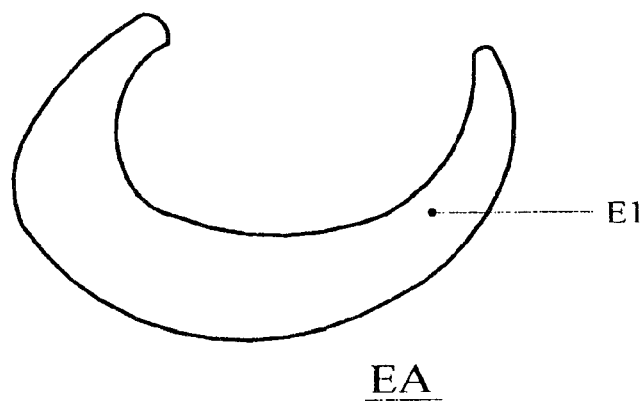
FIG. 2E illustrates the configuration of hanger and holder.
Figure 2E:
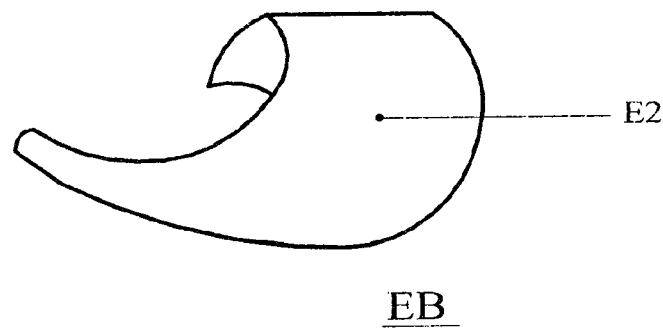
Figure 2E:
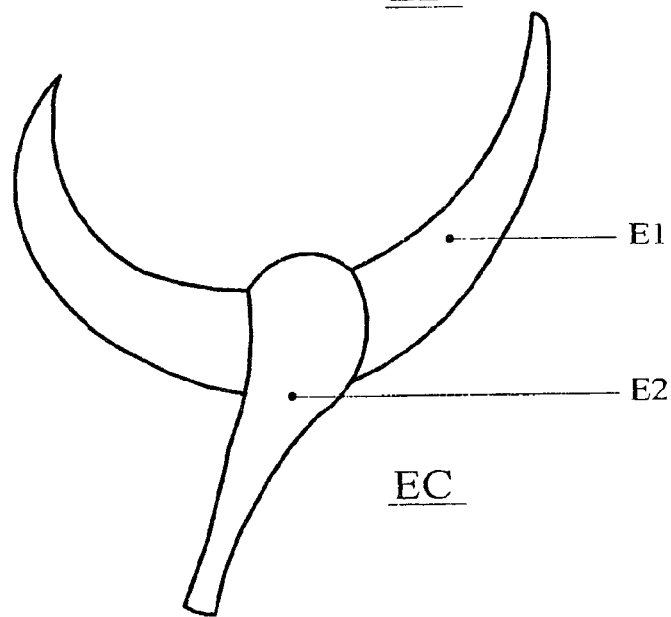

FIG. 2E illustrates the set of a handle and holder. E1 is the handle, and E2 is the holder. EC is the configuration of the handle and holder together.

Figure 3:
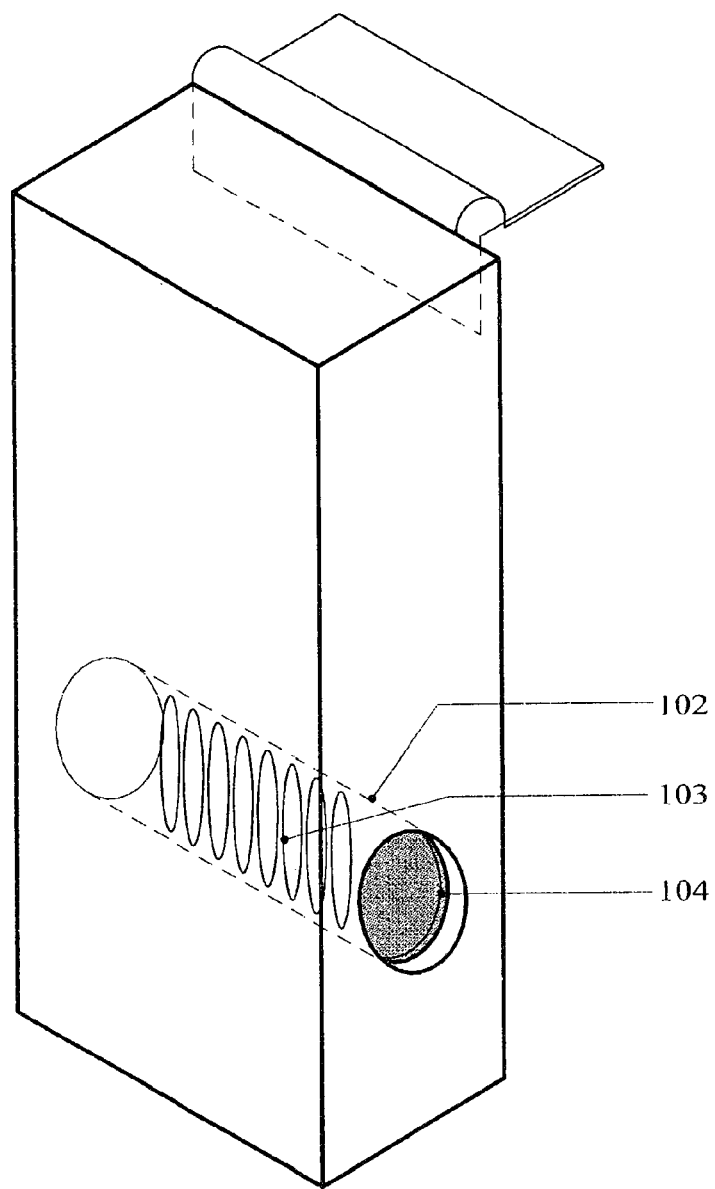
FIG. 3 illustrates the lowest section as well as the configuration of the spring hole located in all three sections.

FIG. 3 illustrates the lowest (third) section of the three sections set. There are two features that differentiate the lowest section from the other two. First, it has no lower hinge, as there is no fourth section that it must attach to. Second, because there is no fourth section, there is no need for additional material below the spring hole 102 in the third section. As a result, section three is distinctly different from the two sections above it.

Figure 4A:
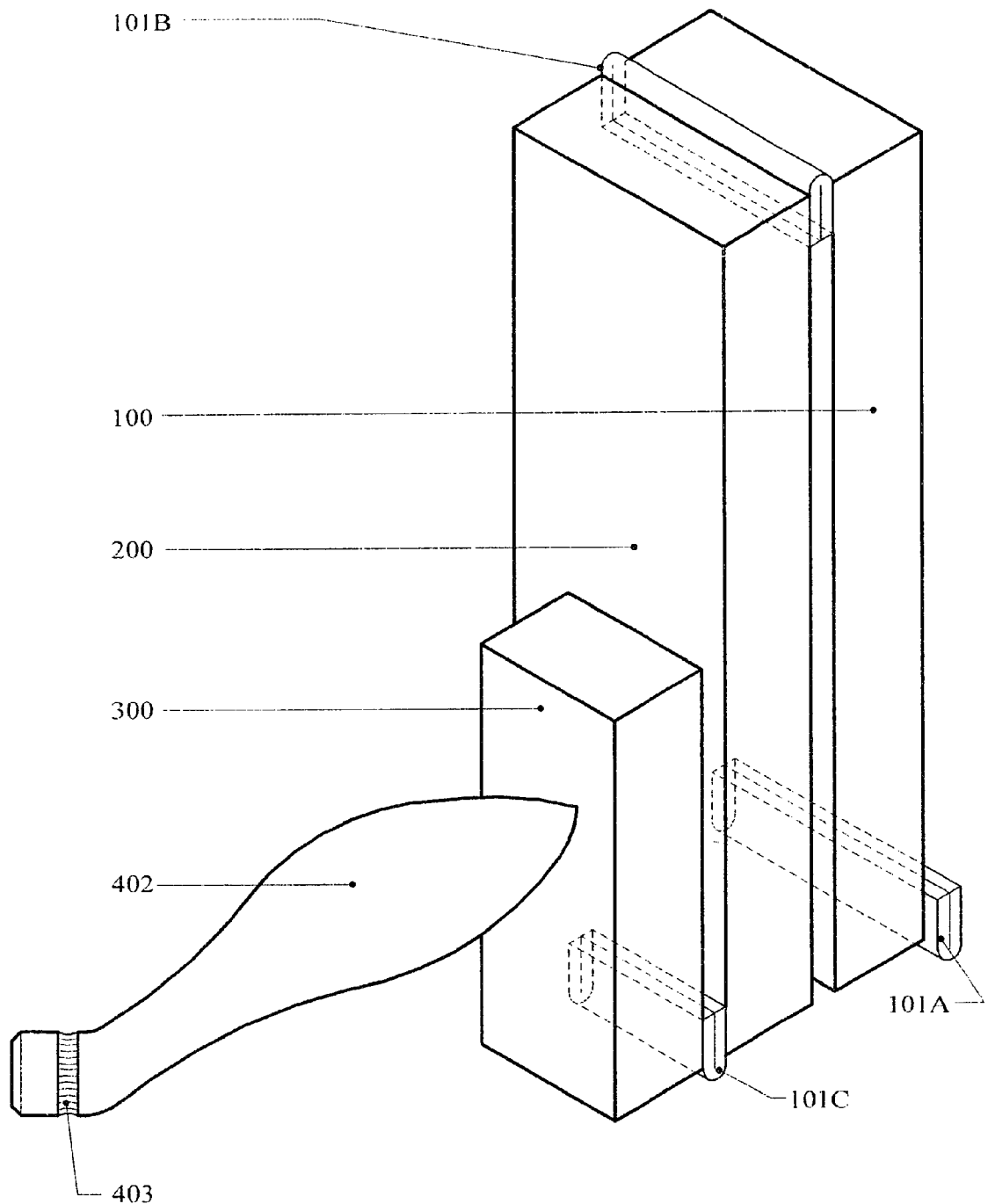
FIG. 4A illustrates the design of the support arm in assisting the sections remain in the stowed state.

FIG. 4A illustrates a support arm 402 designed to keep the sections/panels and slats in their desired location. As the weight of the sections and slats would cause the device to fall into the open position, a support mechanism is required to keep the device stowed when not needed. There are two key points to be emphasized. First, there is a spring 403 located at the base of the support arm 402 to allow it to flex comfortably. Second, support arm 402 is curved on both the top and bottom faces. When someone wishes to extend the device into its open position, the arm can be lifted up to allow the device to pass. When someone wishes to return the device to its stowed position, the arm can be lifted up again to allow the device to pass.

Figure 4B:
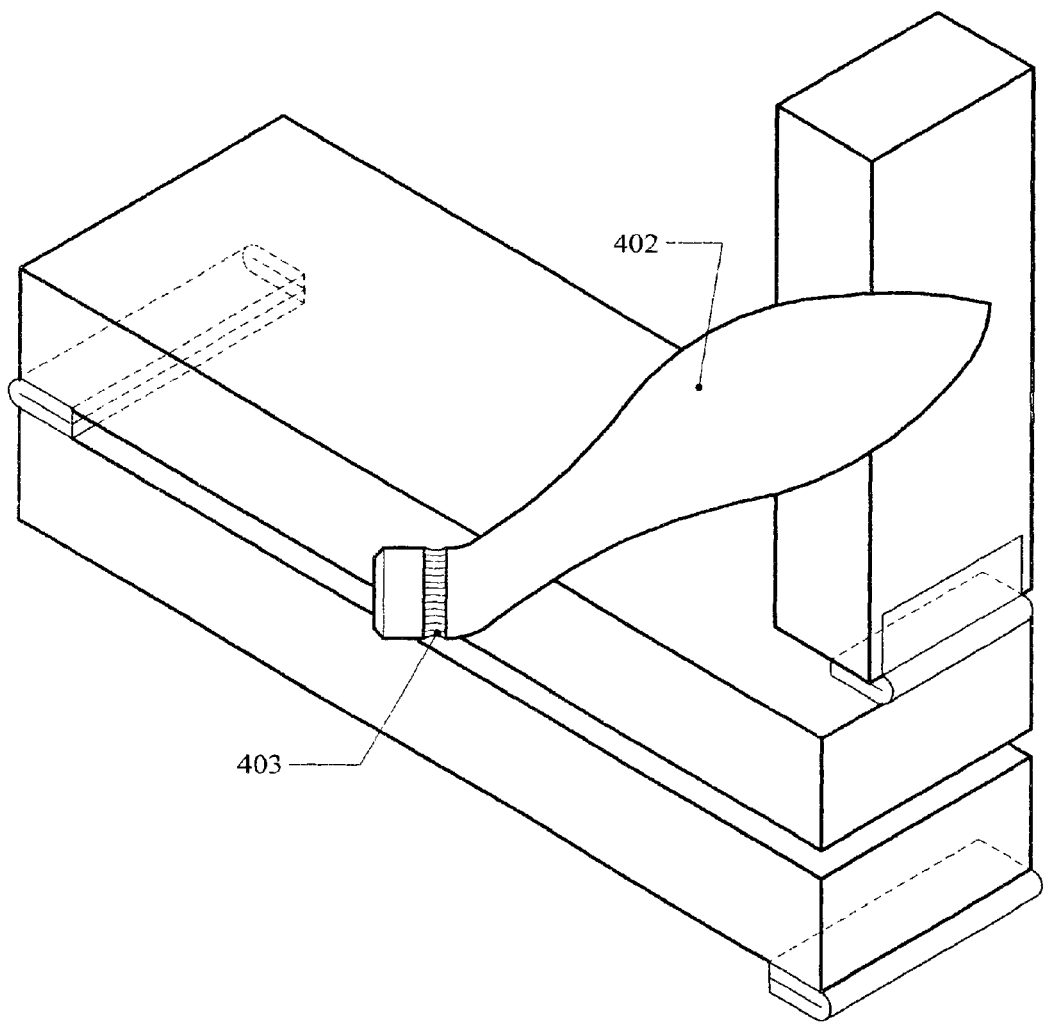
FIG. 4B illustrates the support arm as it allows the sections to be pulled into the deployed state.

FIG. 4B illustrates the support arm 402 may be pushed out of the way to allow someone to extend the sections into the open position.

Figure 4C:
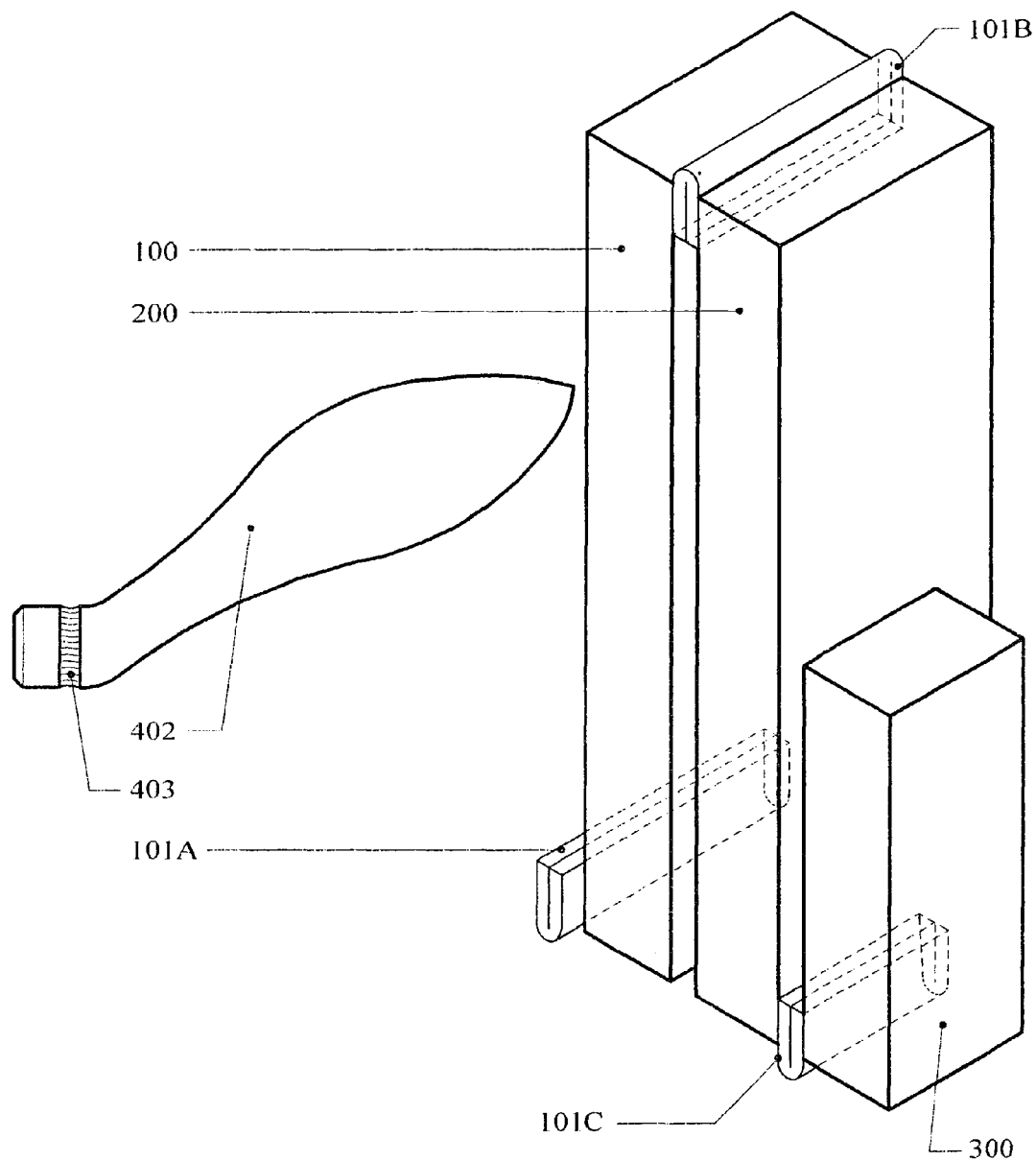
FIG. 4C illustrates support arm as it allows the sections to return to the stowed state.

FIG. 4C illustrates the sections returning to the stowed position by pushing all sections together. Again, the support arm 402 may be pushed out of the way to allow someone to return the device to its closed position.

Figure 5:
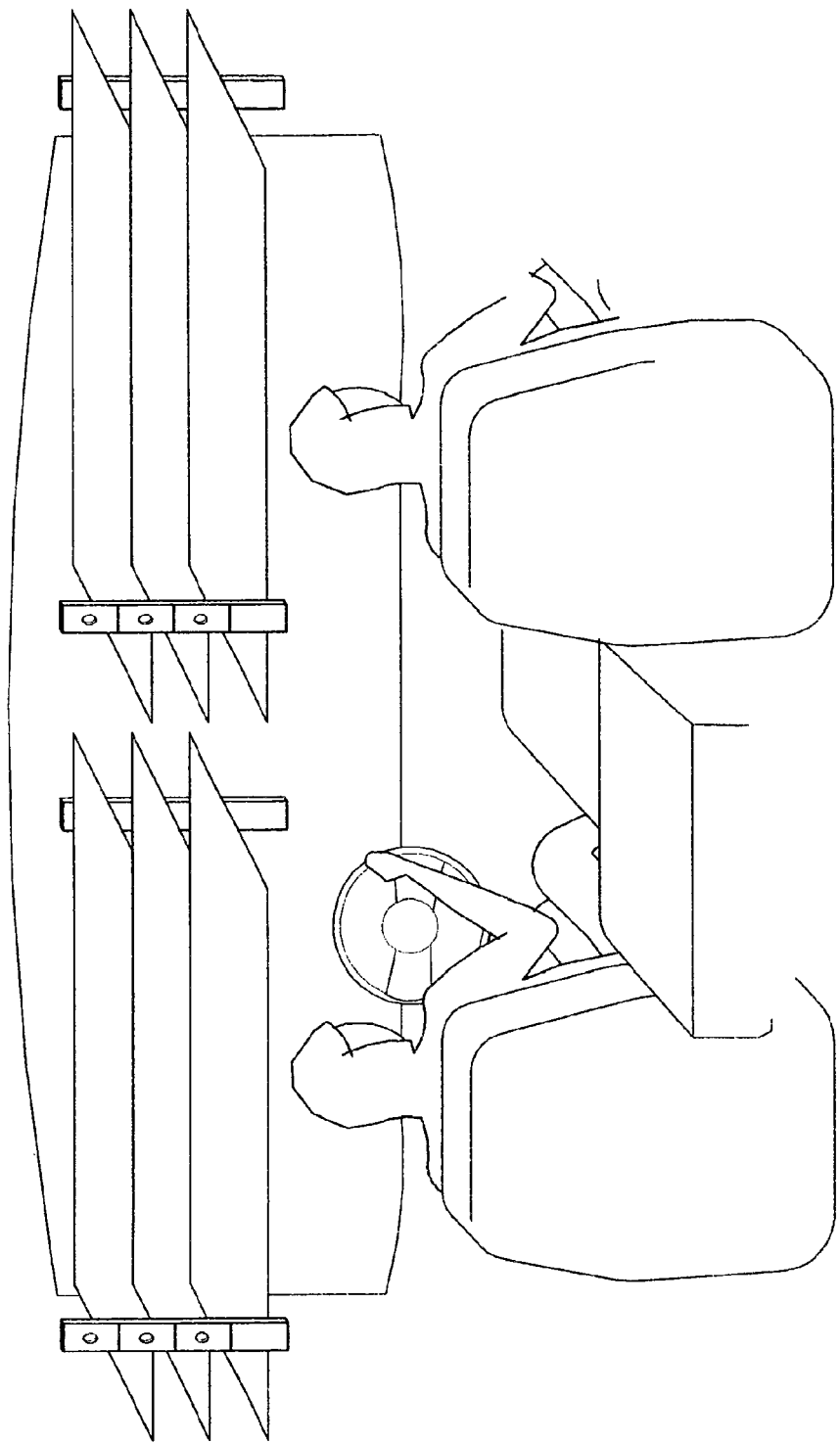
FIG. 5 illustrates the device usage on the front windshield.

FIG. 5 illustrates this device may be installed behind a wind shield.

Figure 6:
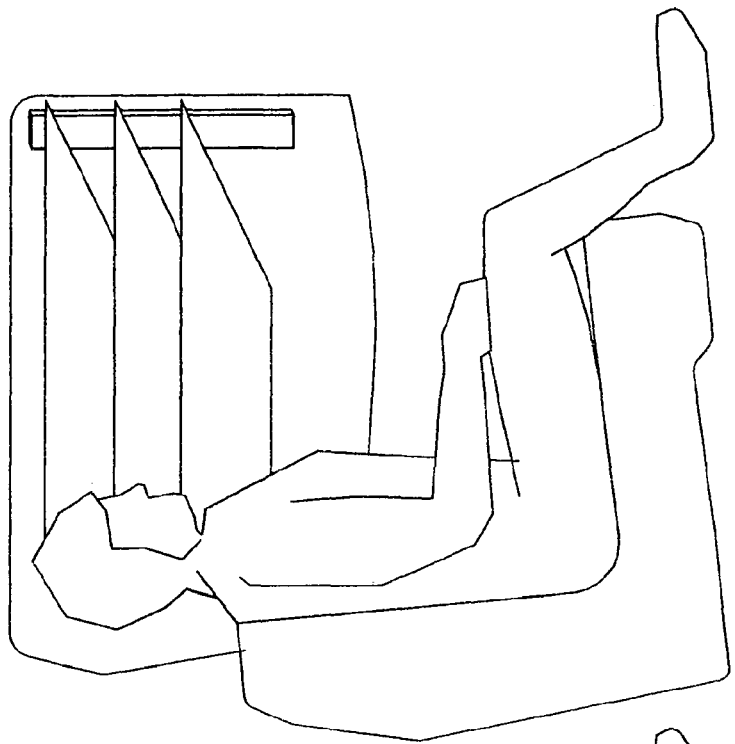
FIG. 6 illustrates the device usage on side windows.
Figure 6:
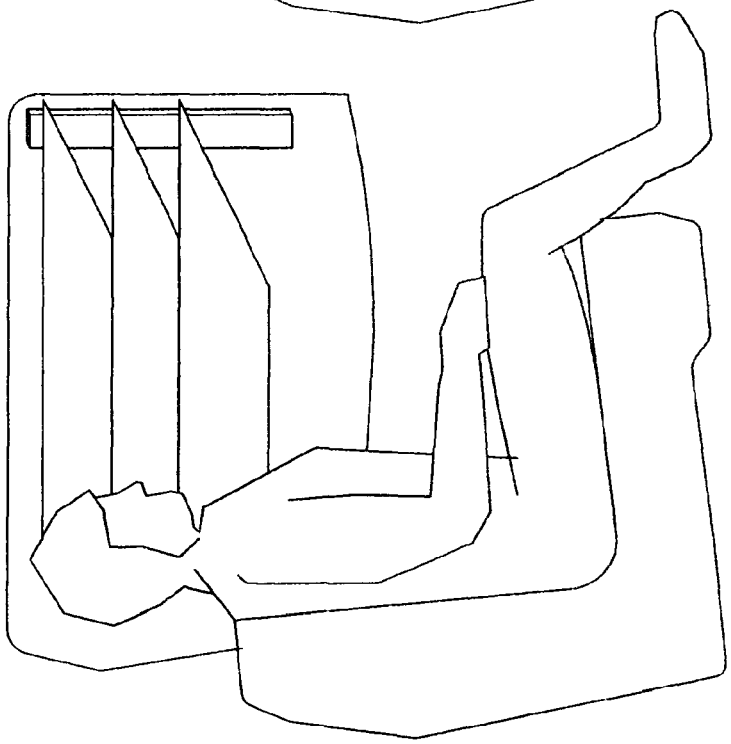

FIG. 6 illustrates this devices may be installed beside side windows, both front and rear.

Figure 7:
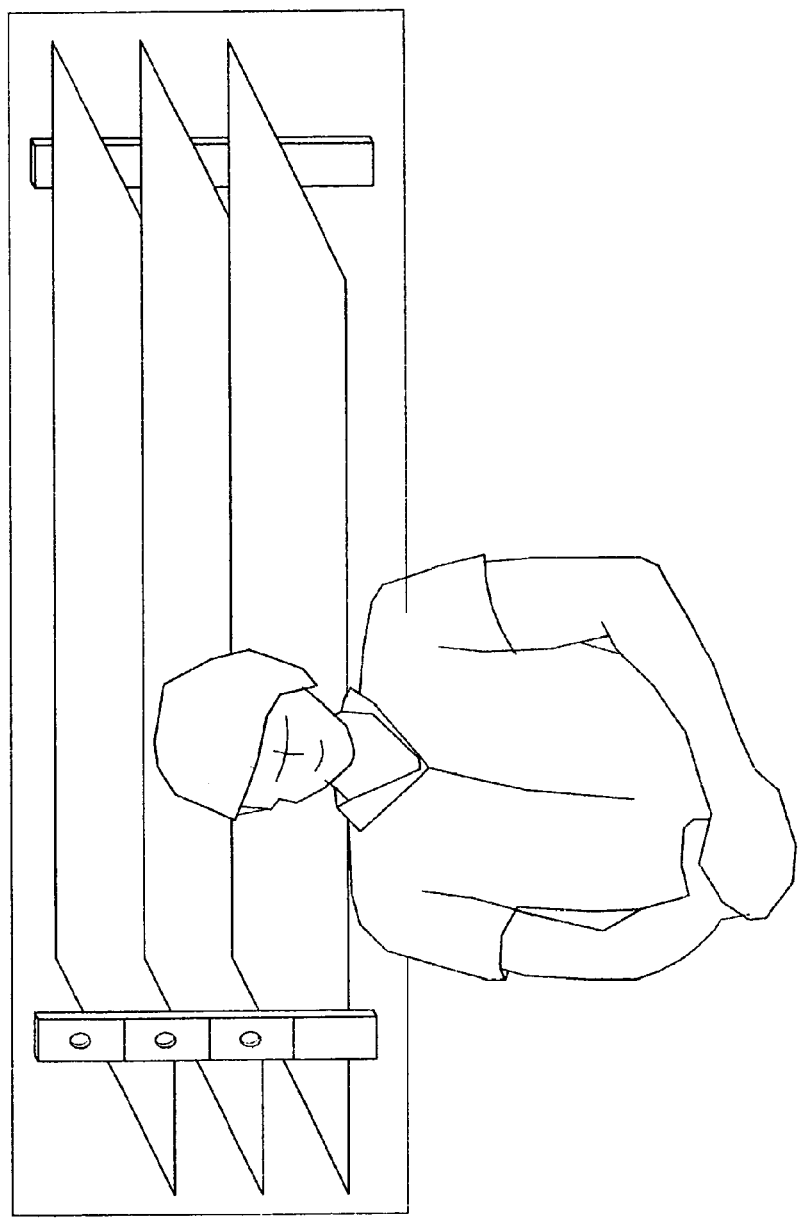
FIG. 7 illustrates the device usage on the back window.

FIG. 7 illustrates this device may be installed before a back window.

Figure 8:
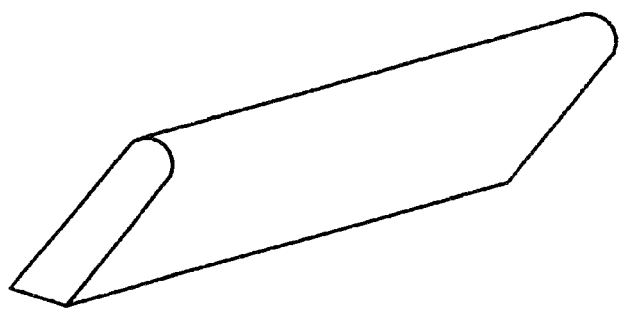
FIG. 8 illustrates an insert that can be used to improve the strength of a screw or nail mount into the ceiling.
Figure 8:
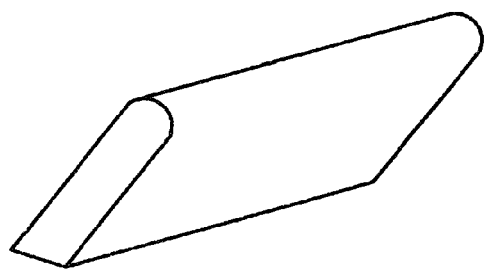
Figure 8:
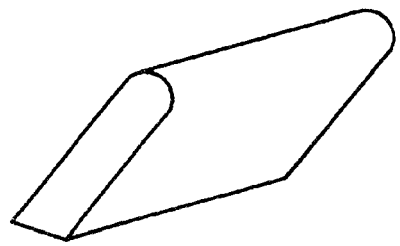

FIG. 8 illustrates stiff cushions designed to replace the soft, spongy material that may be located in the lowest section of the ceiling where it meets the car door. With hard material, hard enough to bear screw or nail, it may be easier to mount the device to the ceiling using screws or bolts. It can be just one, or two combined together.

Figure 9:
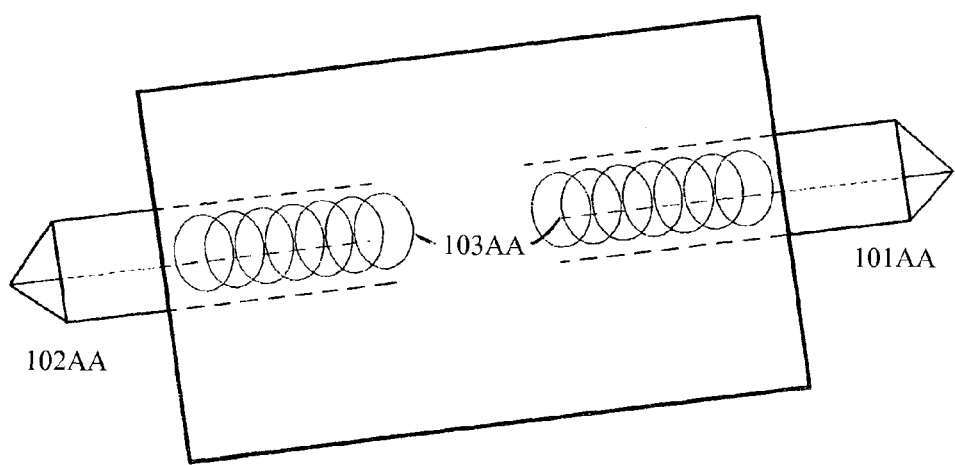
FIG. 9 illustrates the central slat that interfaces with the sections and provides protection for users from the sun.

FIG. 9 illustrates the component that fits between the sections, the slat. This slat is rectangular in shape. There is a central axis that extends laterally through the center of the slat. On this axis is a pair of spring holes similar to element 102 in FIG. 1. In these holes there may be a pair of springs 103AA that have a pair of slat sticks 101AA and 102AA attached to the outside ends of the springs. These slat sticks 101AA and 102AA are to be inserted into the spring holes 102 located on the corresponding sections, which may allow the slat to remain stationary relative to the sections.

Figure 10:
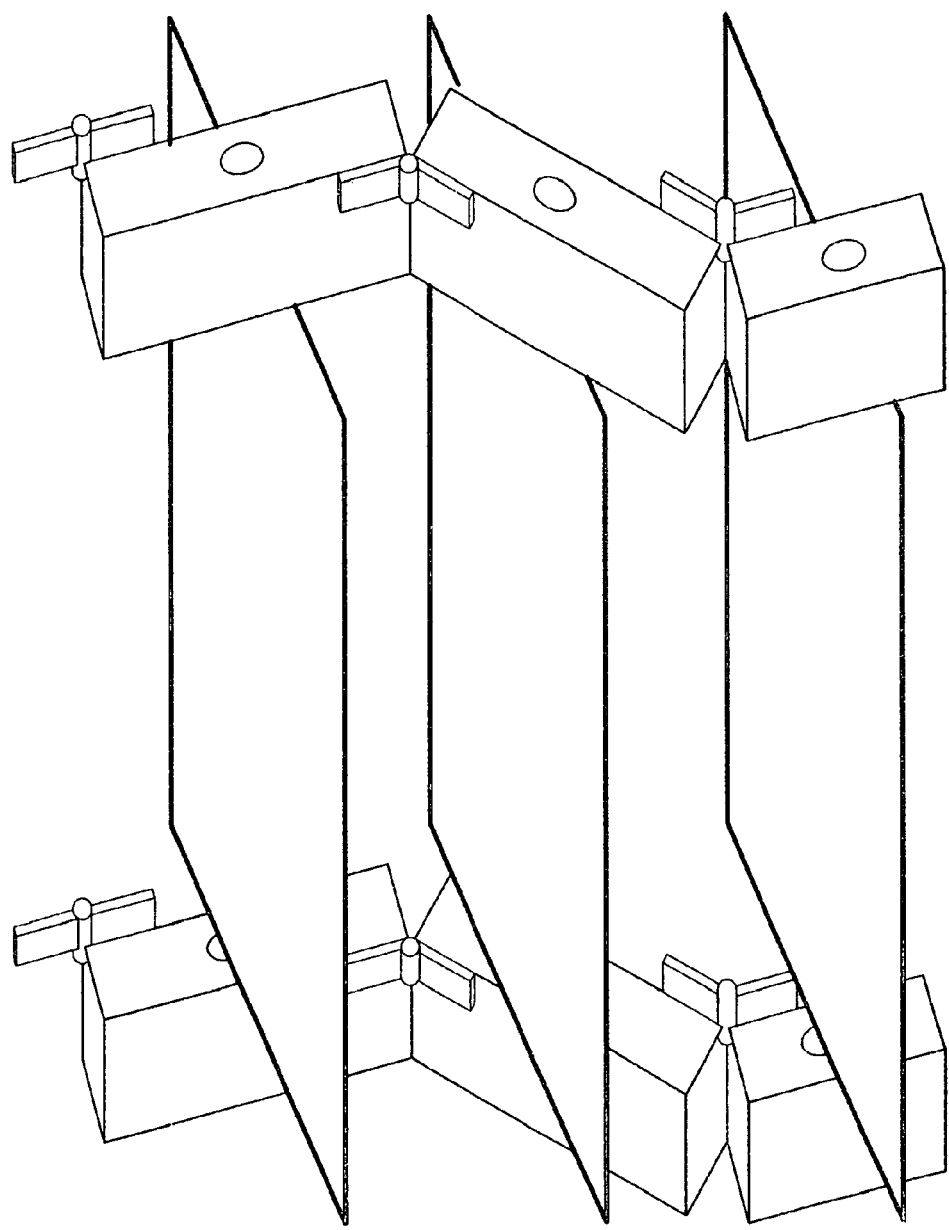
FIG. 10 illustrates the deployed configuration of the sections, with a focus on the slight bends at the hinge locations.

FIG. 10 illustrates that the sections are not perfectly linear in their deployed state. This is because a perfectly linear configuration may result in a more rapid deterioration of the components. If there is a slight angle at each hinge, such as a 5 degree offset, then the sections may safely fold into each other without damage.

The invention claimed is:

1. An extensible car window shading apparatus mountable inside the car and comprising a plurality of slats having at each longitudinal end a slat hole in which a slat spring attached to a slat stick is inserted, such that the slat stick extends outwardly from the slat hole, a plurality of panels, the plurality of panels numbering exactly twice the number of the plurality of slats, such that there is a panel at each longitudinal end of each slat, wherein each panel has a panel hole in which a panel spring is inserted, the panel hole being configured to receive the slat stick, and wherein the panels on each respective end of each slat are joined by hinges, such as to allow folding or deploying of the extensible car window shading apparatus by a user, and a support arm that keeps the extensible car window shading apparatus in folded position, wherein the support arm comprises an articulation that allows the user to temporarily push aside the portion of the support arm that keeps the extensible car window shading apparatus in folded position, such that the extensible car window shading apparatus can be deployed under the effect of gravity when the user needs the extensible car window shading apparatus in deployed position.

2. The extensible car window shading apparatus of claim 1, wherein the articulation of the support arm comprises an arm spring located at the base of the support arm, such that, after the user's push aside action ends, the support arm returns to its initial position without the need of an action by the user, such that, if the extensible car window shading apparatus is folded by the user, it is held by the support arm in the folded position.

3. The extensible car window shading apparatus of claim 2, wherein the apparatus has three slats, wherein the panels are rectangularly shaped, wherein there is a total of six panels, three on each side of the apparatus, and wherein the top and middle panels are of the same size and have the panel hole centrally located, such as the upper portion of the panel situated above the panel hole is the same in size as the bottom portion of the panel situated below the panel hole, while the bottom panel on each side is shorter than the top and middle panels, such as that its upper portion is the same in size as the upper and bottom portions of the top and middle panels, while its bottom portion is shorter.

4. The extensible car window shading apparatus of claim 3, wherein the upper end of the top panels is attached to a mounting hinge that is wider than the hinges between the panels, such that to generate greater holding power at the mounting surface.

* * * * *